March 8, 1932. W. W. PETTIBONE 1,848,801
FURNACE WATER SCREEN
Filed June 20, 1928
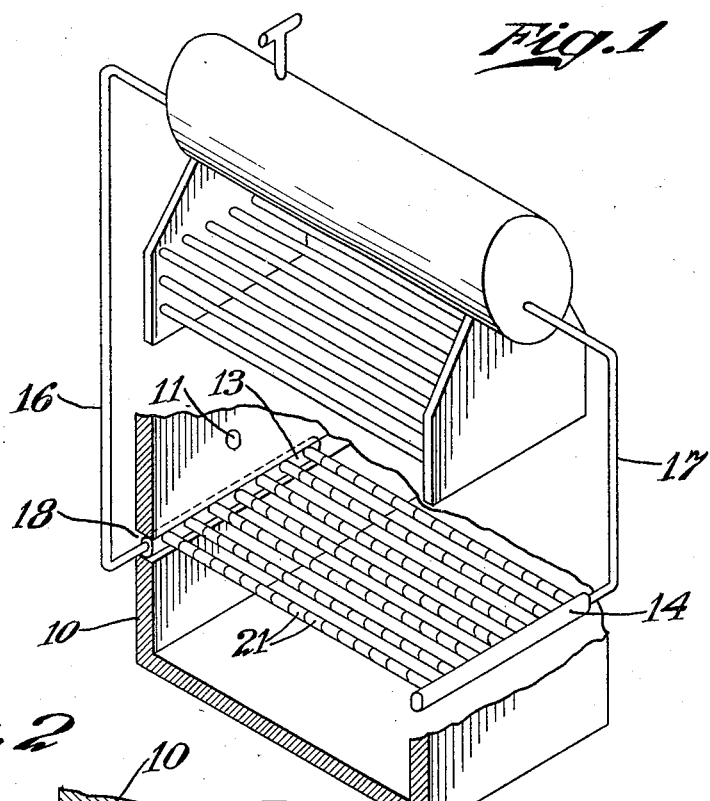
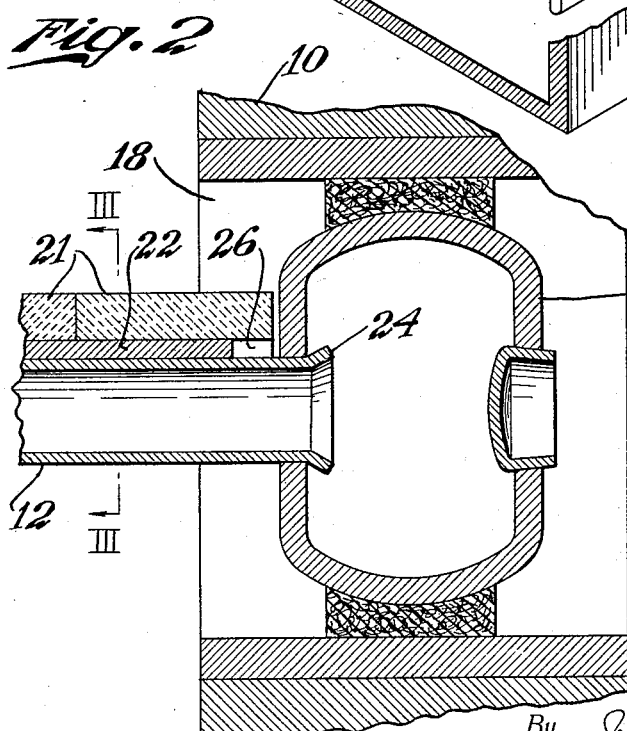
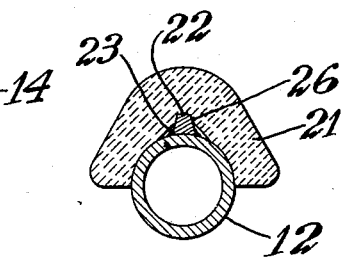
Inventor
W. W. Pettibone
By Johnston & Jennings
Attorneys Patented Mar. 8, 1932

1,848,801

UNITED STATES PATENT OFFICE

WALTER W. PETTIBONE, OF BIRMINGHAM, ALABAMA

FURNACE WATER SCREEN

Application filed June 20, 1928. Serial No. 286,924.

My invention relates to water screens for boiler furnaces and has for its object the provision of apparatus of the character designated which shall be simple of design and easy of application and which shall provide protection against overheating for the water circulating tubes of the screen.

A more particular object of my invention is to provide an improved water screen for the ash pit of a powdered fuel fired furnace, said screen embodying protective refractory tiles for the water tubes of the screen, and wherein the tiles are readily and easily installed and maintained in proper position.

A still further object of my invention is to provide a water screen embodying water circulating tubes having a protective refractory covering on one side thereof, together with a novel reinforcing means for the tubes which also serves as a lock for the covering.

In the operation of powdered fuel fired furnaces, it has been found desirable to provide a water screen in the lower part of the furnace, above the ash pit, in order to cool the falling ash below the melting point whereby it may be readily removed from the ash pit. Where the water screen comprises bare water circulating tubes, exposed to the radiant heat of the furnace, steam accumulates in the tops of the tubes, resulting in displacement of the water therein, and temperature differences in the tubes, all of which leads to warping and bending of the tubes and the shortening of their service life. It has accordingly been found necessary to provide a protecting covering of refractory for the tubes in order to protect them from the intense radiant heat of the furnace.

Difficulties have been encountered in the provision of such a covering, however, due to the added weight on the tubes which causes them to bend when heated even with the protection afforded by the covering. Furthermore, serious difficulties have been encountered in providing a covering for the tubes which would remain in its proper position on the tubes when subjected to the severe conditions of service.

In accordance with my invention I have provided a water screen embodying the usual water circulating tubes and have provided a novel means for reinforcing the tubes of the screen so as to add to their strength. Furthermore, the reinforcing means for the tubes cooperates with a specially designed tile covering therefor, to hold the covering in place. By means of my invention I increase the protective action of the screen as well as increase the strength of the tubes, while my improved tile covering adds radiant surface to the furnace, thus assisting in combustion, especially at low rates of furnace operation.

Apparatus embodying features of my invention is illustrated in the accompanying drawings, forming a part of this application, wherein Fig. 1 is a diagrammatic, perspective view showing the application of my improved water screen to a boiler furnace;

Fig. 2 is a fragmentary, longitudinal, sectional view of a tube and its connection to its header and showing in detail the manner of application of my improved tile cover; and Fig. 3 is a sectional view taken along the line III—III of Fig. 2.

Referring now to the drawings for a better understanding of my invention, I show a boiler furnace 10, only a part of the furnace wall being indicated. At 11 is shown an opening in the furnace wall for the introduction of powdered fuel and air for burning in the furnace. Extending longitudinally of the furnace, below the opening 11, is my improved water screen which comprises a plurality of tubes 12 connected to headers 13 and 14, said headers being connected, at ends opposite to each other, with pipes 16 and 17, leading into the water circulating system of the boiler. In order to provide easier assembly of the tubes 12, the headers 13 and 14 are preferably set in recesses 18 provided in the furnace walls, only one of which is shown.

Each of the tubes 12 is protected from the radiant heat of the furnace by means of a plurality of arcuate tiles 21 arranged over the tubes. Each of the tubes is provided with a reinforcing rod such as 22 extending nearly from end to end thereof and secured thereto by autogenous welding, as shown at 23. In order that the tubes 12 may be inserted in the manifolds and expanded therein, as shown at 24 in Fig. 2, the rods 22 do not extend entirely to the ends of the tubes.

The rods 22 may be of any desired shape, but I prefer them in the shape shown in Fig. 3 for the reason that this shape affords an excellent locking means for the tiles 21. Each of the tiles 21 is provided with a groove 26 extending from end to end thereof, the groove being complementary to the rod 22. Thus, with my invention, in assembling the water screen, the tiles 21 are simply laid on the tubes 12 with the rods 22 fitting in the groove 26.

It will be seen, with the arrangement described, that the rods 22 provide a reinforcement for the tubes 12, preventing their bending under the weight of the tile when subjected to heat and, once the tiles are in position, they are held in place and prevented from turning by the engagement of the reinforcing rod with the grooves in the tiles.

While I have shown my invention in but one form, it will be obvious to those skilled in the art that it is not so limited but is susceptible of various changes and modifications, without departing from the spirit thereof, and I desire therefore that only such limitations shall be placed thereupon as are imposed by the prior art or as are specifically set forth in the appended claims.

What I claim is:

1. In a water screen for a furnace embodying a plurality of spaced circulating tubes circular in cross section, each having a reinforcing rod extending longitudinally thereof and welded thereto on its side inwardly of the furnace, a tile for covering each of said tubes, each of said tiles having a longitudinal groove fitting over the reinforcing rod.

2. In a water screen for the ash pit of a powdered fuel furnace, said screen embodying a plurality of spaced water circulating tubes circular in cross section and arranged beneath the combustion zone in the furnace, a plurality of tiles for each of the tubes, each of said tiles having a longitudinal groove on the under side thereof, and a member formed on the upper side of the tube and fitting into the groove.

In testimony whereof I affix my signature.

WALTER W. PETTIBONE.